(No Model.) 2 Sheets—Sheet 1.
C. MEIER.
DREDGING APPARATUS.
No. 536,756. Patented Apr. 2, 1895.
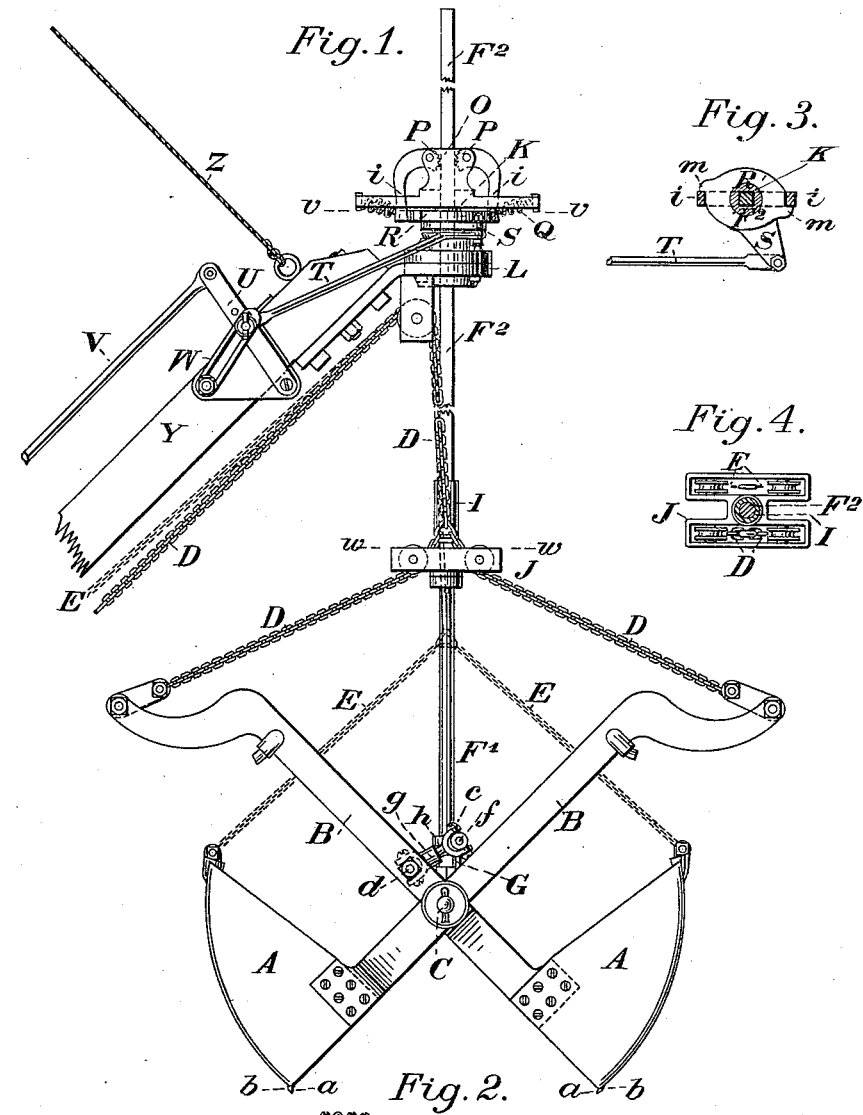

(No Model.) 2 Sheets—Sheet 2.
C. MEIER.
DREDGING APPARATUS.
No. 536,756. Patented Apr. 2, 1895.
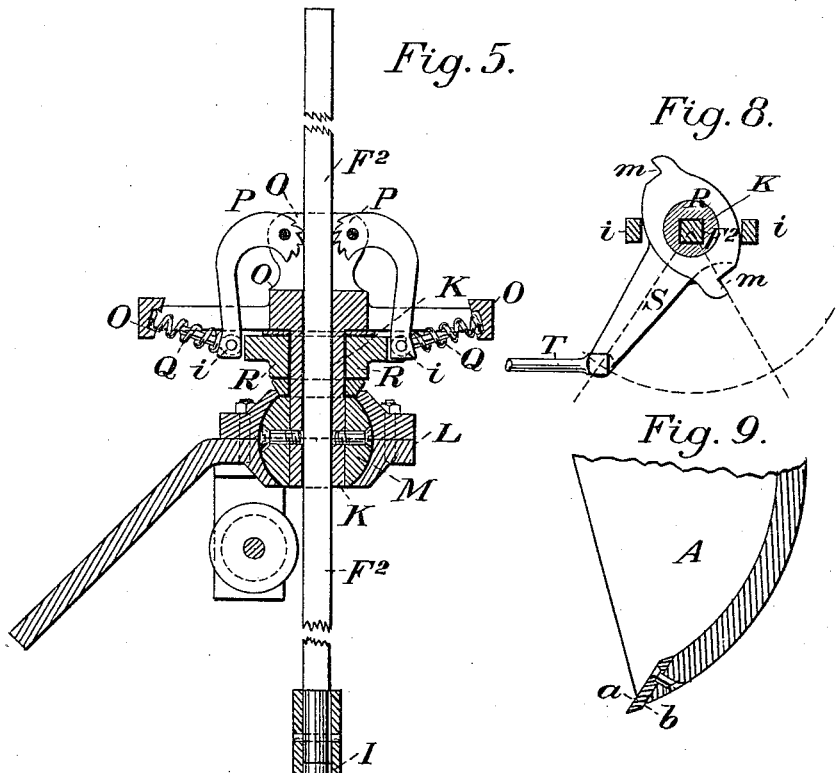

UNITED STATES PATENT OFFICE.

CASPAR MEIER, OF SAN FRANCISCO, CALIFORNIA.

DREDGING APPARATUS.

SPECIFICATION forming part of Letters Patent No. 536,756, dated April 2, 1895.

Application filed March 16, 1894. Serial No. 503,882. (No model.)

*To all whom it may concern:*

Be it known that I, CASPAR MEIER, a citizen of the United States, residing in the city and county of San Francisco, State of California, have invented certain new and useful Improvements in Dredging Apparatus; and I hereby declare the following specification and drawings therewith to be a complete description of my improvements and the manner of applying the same.

My invention relates to dredging apparatus employing grab or clam-shell buckets, and to mechanism for operating the same.

My invention includes means for locking and releasing, automatically, upward movement of the stem or shaft on which the buckets are supported, so they may be closed or opened at any point or any depth, turning from a fixed center and irrespective of the movement of the guiding stem or shaft, and in releasing the latter automatically at various points of the closing action, as the hardness of the material or other circumstances may require; also further includes an adjustment of the buckets in the plane of their hinged axes, by means of a ball joint above the axes of the buckets.

The invention also consists in the construction, arrangement and combination of parts substantially as will be hereinafter described and then more particularly pointed out in the claims.

In the annexed drawings: Figure 1 is a side elevation of the buckets and their attendant apparatus, for a dredging machine made according to my invention. Fig. 2 is a plan view on the line $w$—$w$, Fig. 1, with the guiding stem or shaft removed. Figs. 3 and 4 are details of Fig. 1. Fig. 5 is a vertical section showing the guiding stem or shaft with its bearings and gripping mechanism at the top. Figs. 6 and 7 are details showing the construction of the automatic mechanism for releasing the main stem or shaft. Fig. 8 is an enlarged view of the disengaging cams for releasing the stem or shaft on which the buckets are mounted when the gripping jaws are disengaged. Fig. 9 is a section of the bucket showing the manner of constructing detachable cutting edges.

Similar letters of reference are employed to designate like parts in the different figures of the drawings.

In the common manner of operating dredging buckets their cutting action in entering and filling is a component of the movement of the buckets on their hinged axes, and upward movement of the stem or spar on which they are mounted, the penetrating force depending upon the gravity of the buckets and their connected parts, but in the present method the stem or spar is held rigidly against end movement, and the buckets forced into the material to be raised, turning on a fixed axis from which their outer contour is described, so as to deal with hard as well as soft material.

Referring to the drawings, A A are the buckets attached rigidly to the cross levers B B, having their fulcrum or axis on the shaft C. These levers B and buckets A are operated for the closing action by the chains D, and are expanded or opened by the chains E, both these chains extending to winding gearing or winches in the usual manner.

The buckets A and their attendant mechanism are mounted on a guiding spar or stem $F'$ $F^2$ attached to the shaft C by the clamps G and a ball bearing H, so as to admit of some movement parallel to the plane of the shaft C, as indicated by dotted lines in Fig. 7, so the shaft C and buckets A may in this plane adapt themselves automatically to an uneven surface or bottom.

The stem $F'$ $F^2$ is revoluble to a certain extent, as will be hereinafter explained, and is of a square section above the coupling I, Fig. 5. Below this sleeve or coupling is a pulley-frame J loosely mounted on the stem $F'$ and provided with pulleys as shown in the plan view, Fig. 4, for deflecting the chains D, and for raising the stem F after the buckets A are closed and filled; also for deflecting the chains E when the buckets A are expanded, and in both cases intensifying the strain as the extremes of opening and closing are reached.

The upper or squared part of the stem $F^2$ passes loosely through a sleeve K, held and supported in the main frame L by a ball joint M, as shown in Fig. 5. On the upper end of this sleeve or shell K, and integrally therewith, is a bracket or frame O, in which is a pair of gripping jaws P having teeth and a cam form, as seen in Fig. 5. These gripping jaws P P are eccentric, and act like a cam, being pressed in contact by the springs Q Q, so that upward thrust on the stem F² tends to grip it more firmly. These gripping jaws P P are loosened by a double cam R adjusted by a crank S and link T, as shown in Figs. 3 and 8, the jaws P P being engaged in Fig. 8, and distended or released in Fig. 3.

The link T connects to a lever U, operated by a rod V that extends down to the deck of the barge on which the machinery is mounted, or to some place accessible for adjustment. A slotted link W is provided to regulate the position of the cams R and other gearing to operate the jaws P P, as shown in Fig. 1. The main member L is bolted to a swinging spar or boom Y, supported by a stay Z in the usual manner.

The function of the gripping jaws P P is, as before explained, to hold the stem F' F² against upward movement while the buckets A are closing or being filled, or, in other words, to cause the buckets to swing from a fixed center so they will cut into hard material when required, automatically releasing the main stem on which they are supported at various positions of closing, as will be hereinafter described.

Referring again to the buckets A, these are shod at their cutting edges with knives a, as seen in Fig. 9, consisting of a plain bar of tempered steel of symmetrical section, the edges beveled as shown, so the bar can be reversed when worn, and thus secure two cutting edges. The knives or cutters a extend a little below or beyond the arc or back of the buckets A, as shown at b, Fig. 9, so that in closing the buckets the knife a will cut a path a little beyond the buckets' range, and thus permit the entrance of water to avoid friction and what is termed sucking action.

The operation of the machinery is as follows: Supposing the buckets A to be opened and lowered to the bottom, and the cam R to be in the position shown in Fig. 8, and the jaws P P pressing on the stem F² by the springs Q Q, the chains D are then wound or drawn in, closing the levers B B and the buckets A A, the stems F' F² being firmly held against upward movement, and the cam R held in a fixed position by the members S, T, U and Y. In this manner the buckets A A would be closed and filled, but could not be raised by the chains D because of the main stem being locked by the jaws P P. This is provided for in the following manner: Connected to one of the levers B and to the stem F' is the toggle gearing, shown in perspective at c, Fig. 1, and enlarged in Figs. 6 and 7. In the last named figures the parts are shown disconnected, in plan view, extended so as to render the construction more clear.

Referring to Fig. 6, the ball bearing d is attached to the lever B at e, and by means of the swivel joints g and a to a stud f rigidly attached to the stem F' by a screw h², as shown in Fig. 7. Thus it will be seen that as the levers B are closed, the stems F' and F² are revolved, turning at the same time the ball joint M, sleeve K, frame O, and the gripping jaws P P; but the cam R being held stationary by the link T does not partake of this rotative movement, so the arms i i of the gripping jaws P P move around on the cam R to the extremes m m, and into the position shown in Fig. 3, thus releasing the jaws P P and stem F², and permitting the latter to rise with the buckets A by means of the chains D in the usual manner.

The time or position of releasing the stem F is in this manner dependent upon the position of the cam R, and its adjustment by the link T, lever U and rod V, so that by movement of the latter, forward or back, the escapement or release of the arms i i and jaws P P will take place when the buckets A A are partially or wholly closed, as the nature of the material being dredged may demand.

The mechanism for holding and releasing the main stem, on which the buckets are supported, may be modified by various means of transmitting motion from the buckets A A to the gripping mechanism at the top, and for regulating the position of the buckets A A when the stem F² is released, but the devices shown perform the various functions required in a successful manner.

To operate the machine in soft material, or in the usual manner of such dredging apparatus, the rod V is moved forward so the arms i i of the gripping jaws P P will remain extended, and the stem F pass freely up and down through the sleeve K.

When the buckets are filled and raised the chains E E are wound or drawn in, spreading the buckets A A and discharging their contents in the usual manner, also holding them open during their descent, and until the chains D are set in motion for filling and raising.

Having thus explained the nature and objects of my improvements in dredging apparatus, what I claim as new, and desire to secure by Letters Patent, is—

1. In a dredging machine, the combination of the buckets, a supporting spar or stem therefor, a locking device for preventing longitudinal movement of the stem while the buckets are being filled, said device consisting of spring-actuated gripper arms having toothed portions which engage the stem and a rotary releasing device for said locking device consisting of a cam which acts on the arms, substantially as described.

2. In a dredging machine, the combination of the hinged buckets, a guiding spar or stem attached to the axis of said buckets by a swivel bearing, said stem being capable of revolution, a locking device for the stem and a releaser for the lock, substantially as described.

3. In a dredging machine, the combination of the buckets shaped in the form of sectors of a cylinder and provided with rigidly connected arms or levers, a shaft on which the levers are pivotally hung, the peripheries of the buckets being concentric with the axis of said shaft, a guiding spar or stem connected to the bucket shaft and adapted to be locked longitudinally when the buckets are being filled and means for releasing the stem from its locked position, substantially as described.

4. In a dredging machine, the combination of the buckets having arms or levers, a shaft on which said levers are pivotally supported, a guiding spar or stem attached to the bucket shaft by a swivel bearing, said stem being revoluble, a connection between the stem and buckets to produce partial rotation of the stem as the buckets close, substantially as described.

5. In a dredging machine, the combination of the hinged buckets, a supporting spar or stem attached thereto, a locking device for preventing longitudinal movement of the stem while the buckets are being filled, a releasing device for the locking mechanism and a connection, consisting of universal joints between the stem and buckets to produce partial rotation of the stem as the buckets close, substantially as described.

6. In a dredging machine, the combination of the buckets shaped in the form of sectors of a cylinder, their peripheries being concentric with the axes on which they swing, a guiding stem or spar attached by a swivel bearing to the axes of said buckets, a locking device for preventing longitudinal movement of the stem while the buckets are being filled, a rotary releasing cam for disengaging said locking device, and a connection between the stem and the buckets for producing partial rotation of the stem as the buckets close, substantially as described.

7. In a dredging machine, the combination of two buckets arranged as herein described, a guiding spar or stem, a swivel bearing for connecting the said stem to the axes of the buckets, the detachable and reversible cutting knives with which the edges of the buckets are provided and a universal joint connection between the stem and the buckets, substantially as described.

8. In a dredging machine, the combination of the hinged buckets, the pivoted levers on which the buckets are rigidly mounted, a guiding spar or stem attached by a swivel bearing to the axes of the buckets, said stem being capable of revolution and links or other suitable gearing for connecting the stem to the bucket-supporting levers so as to produce partial rotation of the stem as the buckets close, substantially as described.

9. In a dredging machine, the combination of two dredging buckets, a guiding stem or spar pivotally attached to the stem or shaft on which the buckets turn or swing and capable of rotation about its axis in the manner described, serrated gripping jaws of eccentric or cam form that engage the stem and hold it from vertical movements while the buckets are being closed and filled, substantially as described.

10. In a dredging machine, the combination of a pair of hinged buckets, a guiding spar or stem attached to the axes of the buckets, gripping jaws for engaging the stem and holding it against an upward movement while the buckets are being filled, a rotary cam which acts to permit the gripping jaws to open or close and connections between said cam and the buckets so that the closing movement of the buckets may automatically operate the cam so as to release the jaws, substantially as described.

In testimony whereof I have hereunto affixed my signature in the presence of two witnesses.

CASPAR MEIER.

Witnesses:
ALFRED A. ENQUIST,
WILSON D. BENT, Jr.